(12) United States Patent
Smallhorn

(10) Patent No.: US 10,494,098 B2
(45) Date of Patent: Dec. 3, 2019

(54) SIDEWALL SEAT TRACK MOUNTED USB POWER AND COMMUNICATION HUB FOR PASSENGER AIRCRAFT

(71) Applicant: INFLIGHT INVESTMENTS INC., St-Laurent (CA)

(72) Inventor: George R. Smallhorn, St-Laurent (CA)

(73) Assignee: INFLIGHT INVESTMENTS INC., St-Laurent, QC (CA)

( * ) Notice: Subject to any disclaimer, the term of this patent is extended or adjusted under 35 U.S.C. 154(b) by 0 days.

(21) Appl. No.: 15/898,264

(22) Filed: Feb. 16, 2018

(65) Prior Publication Data

US 2018/0229847 A1  Aug. 16, 2018

Related U.S. Application Data

(60) Provisional application No. 62/459,640, filed on Feb. 16, 2017.

(51) Int. Cl.

| | | |
|---|---|---|
| *B64D 11/06* | (2006.01) | |
| *H01R 25/00* | (2006.01) | |
| *H01R 105/00* | (2006.01) | |
| *H01R 29/00* | (2006.01) | |
| *H01R 107/00* | (2006.01) | |
| *H01R 24/62* | (2011.01) | |

(52) U.S. Cl.
CPC ...... *B64D 11/0624* (2014.12); *B64D 11/0696* (2013.01); *H01R 25/006* (2013.01); *H01R 24/62* (2013.01); *H01R 29/00* (2013.01); *H01R 2105/00* (2013.01); *H01R 2107/00* (2013.01)

(58) Field of Classification Search
CPC .......................... B64D 11/0624; H01R 25/006
USPC ...................................................... 297/217.3
See application file for complete search history.

(56) References Cited

U.S. PATENT DOCUMENTS

| | | | |
|---|---|---|---|
| 7,207,523 B2* | 4/2007 | Callahan ............ | B64D 11/0624 174/10 |
| 2011/0079682 A1* | 4/2011 | Raybell .............. | B64D 11/0624 244/122 R |
| 2017/0155268 A1* | 6/2017 | Ayotte .................... | H02J 7/025 |

* cited by examiner

*Primary Examiner* — Anthony D Barfield
(74) *Attorney, Agent, or Firm* — Norton Rose Fulbright Canada LLP

(57) ABSTRACT

The invention provides a system, for providing the distribution of electrical power and data signal communication inside a passenger aircraft to each seat on each seat assembly, the passenger seat assembly comprising a leg frame secured to a floor seat track and a lateral beam spanning between the leg frame and a side wall seat track, the lateral beam supporting a passenger seat and having an outboard end secured in the side wall seat track, the system comprising: a hub secured to the side wall seat track, the hub being connected to both: a source of electrical power; and a source of data signal communication, via a side wall mounted conduit; and an outlet secured to the passenger aircraft seat assembly and communicating with the hub via an outlet conduit.

13 Claims, 15 Drawing Sheets

SIDEWALL SEAT TRACK MOUNTED USB POWER AND COMMUNICATION HUB FOR PASSENGER AIRCRAFT

TECHNICAL FIELD

The invention relates to a USB power and communication hub mounted to a sidewall seat track in an aircraft passenger cabin for serving multiple USB outlets mounted to the structure of an aircraft passenger seat with an adjustable bracket.

BACKGROUND OF THE ART

Aircraft passenger entertainment and inflight communications services often includes an electrical AC power outlet or USB port for powering and recharging batteries in various electronic devices. The USB port can also serve as a communication link to the internet, satellite or onboard content. Many regional type of aircraft have been originally configured without power or communications hubs and outlets. Retrofitting this type of aircraft with a USB power and communications hub mounted to a sidewall seat track and suitable outlets frequently occurs.

Regional passenger aircraft have the outboard seat track uniquely mounted to the sidewall of the aircraft cabin and to a standard inboard floor mounted seat track. Passenger seats have a metal chassis structure removably mounted to the side wall and floor seat tracks and tubular beams spanning between the mounting assemblies. Seat backs, seat pads and armrests are mounted to the chassis.

Passenger aircraft seats must comply with rigid safety standards. Even minor modification of an existing seat assembly exceeding a ±3% change to the empty seat weight is not allowed unless significant, time consuming and costly dynamic testing is accomplished to ensure airworthiness certification standards are maintained. In addition, the time taken to modify each seat assembly is substantial resulting in aircraft downtime. Downtime represents a significant cost to an airline, and must be minimized to make such an undertaking feasible.

Therefore modifying existing passenger seats that do not have a power and communications hub and electric AC power or USB outlets, to then install a power and communications hub and the AC power and USB outlets is difficult without incurring delays, the costs of retesting and recertifying the seats, and the cost of an idle aircraft. In particular regional aircraft with sidewall seat tracks have limited cabin space for alternative locations for power and communications hubs other than onto the seat assemblies where they can interfere with the limited under seat luggage stowage area.

Features that distinguish the present invention from the background art will be apparent from review of the drawings of the invention described below.

DISCLOSURE OF THE INVENTION

The invention provides an AC or USB power and communications hub that can be mounted to the sidewall seat track for serving multiple AC and/or USB outlets. The outlets are disposed in a housing supported from the passenger seats with a mounting bracket that can be quickly installed with cable ties to the tubular beams of a passenger aircraft seat, and provides sufficient adjustment to accommodate the wide variety of aircraft seat structures currently in operation. The arrangement maintains an additional weight to the seat assembly that is within the ±3% limit and thereby avoids the requirements for seat re-certification due to the minimal weight involved.

The invention provides a system, for providing the distribution of electrical power and data signal communication inside a passenger aircraft to each seat on each seat assembly, the passenger seat assembly comprising a leg frame secured to a floor seat track and a lateral beam spanning between the leg frame and a side wall seat track, the lateral beam supporting a passenger seat and having an outboard end secured in the side wall seat track, the system comprising: a hub secured to the side wall seat track, the hub being connected to one or more of: a source of electrical power; and a source of data signal communication, via a side wall mounted conduit; and an outlet secured to the passenger aircraft seat assembly and communicating with the hub via an outlet conduit.

BRIEF DESCRIPTION OF THE DRAWINGS

In order that the invention may be readily understood, one embodiment of the invention is illustrated by way of example in the accompanying drawings.

DETAILED DESCRIPTION

Figure 1:
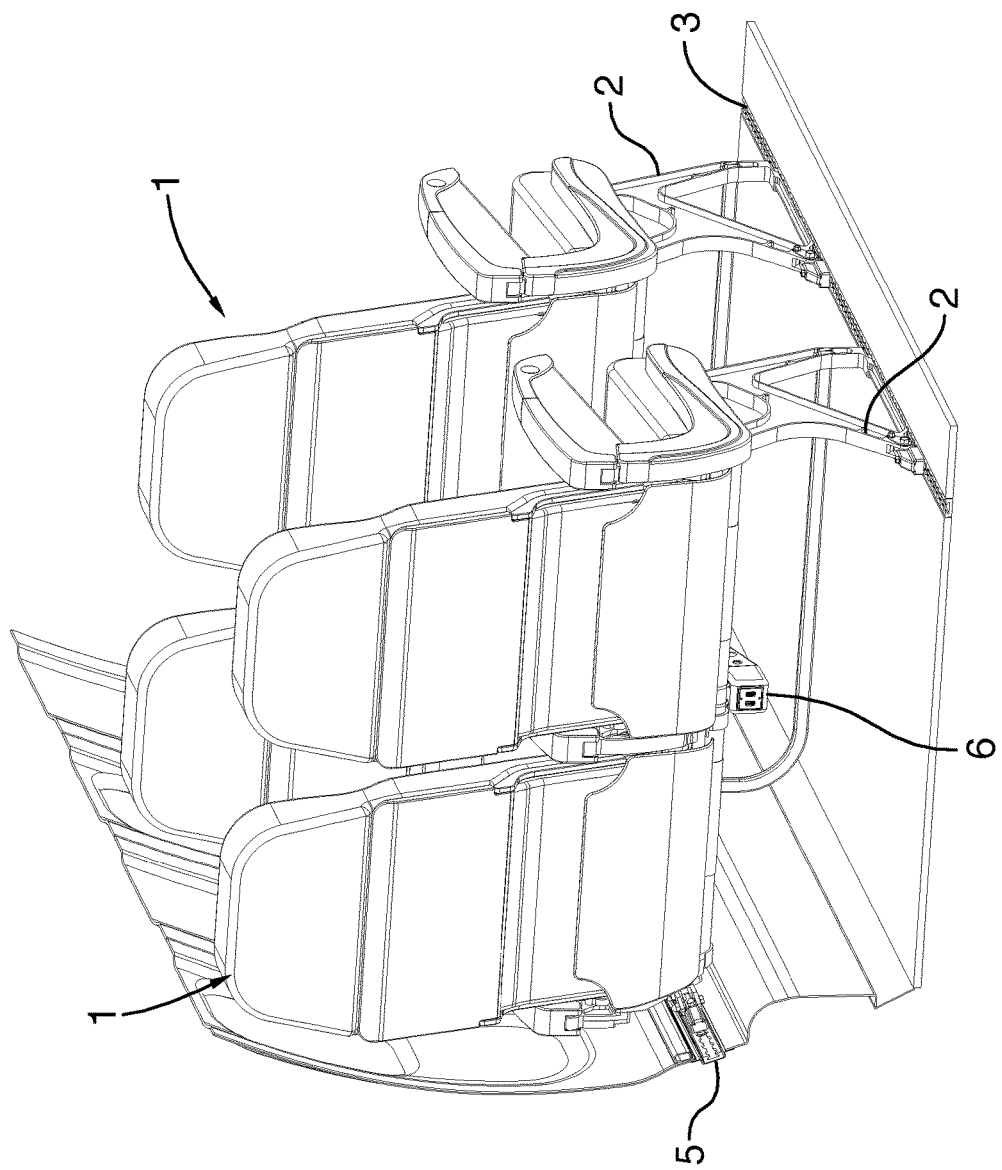
FIG. 1 is a rear-right perspective view of a two seat assembly mounted to a side wall seat track to the left and a floor seat track to the right. A power and communication outlet having two USB ports is mounted in a housing and supported on the horizontal tubular beams of the aircraft passenger seat structure.
Figure 2:
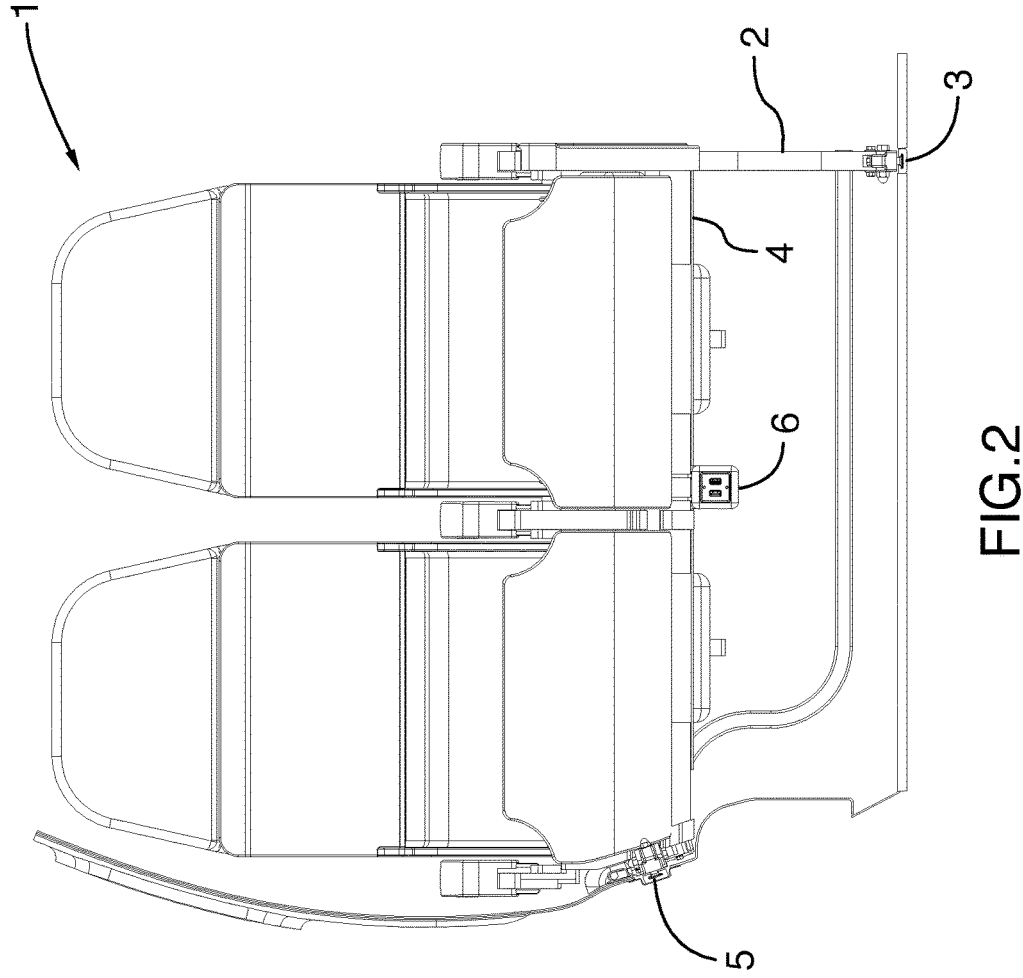
FIG. 2 shows the USB housing and two seat assembly from the rear. The side wall seat track supports the seat assembly to the left and the floor seat track with a leg supports the seats on the right.
Figure 3:
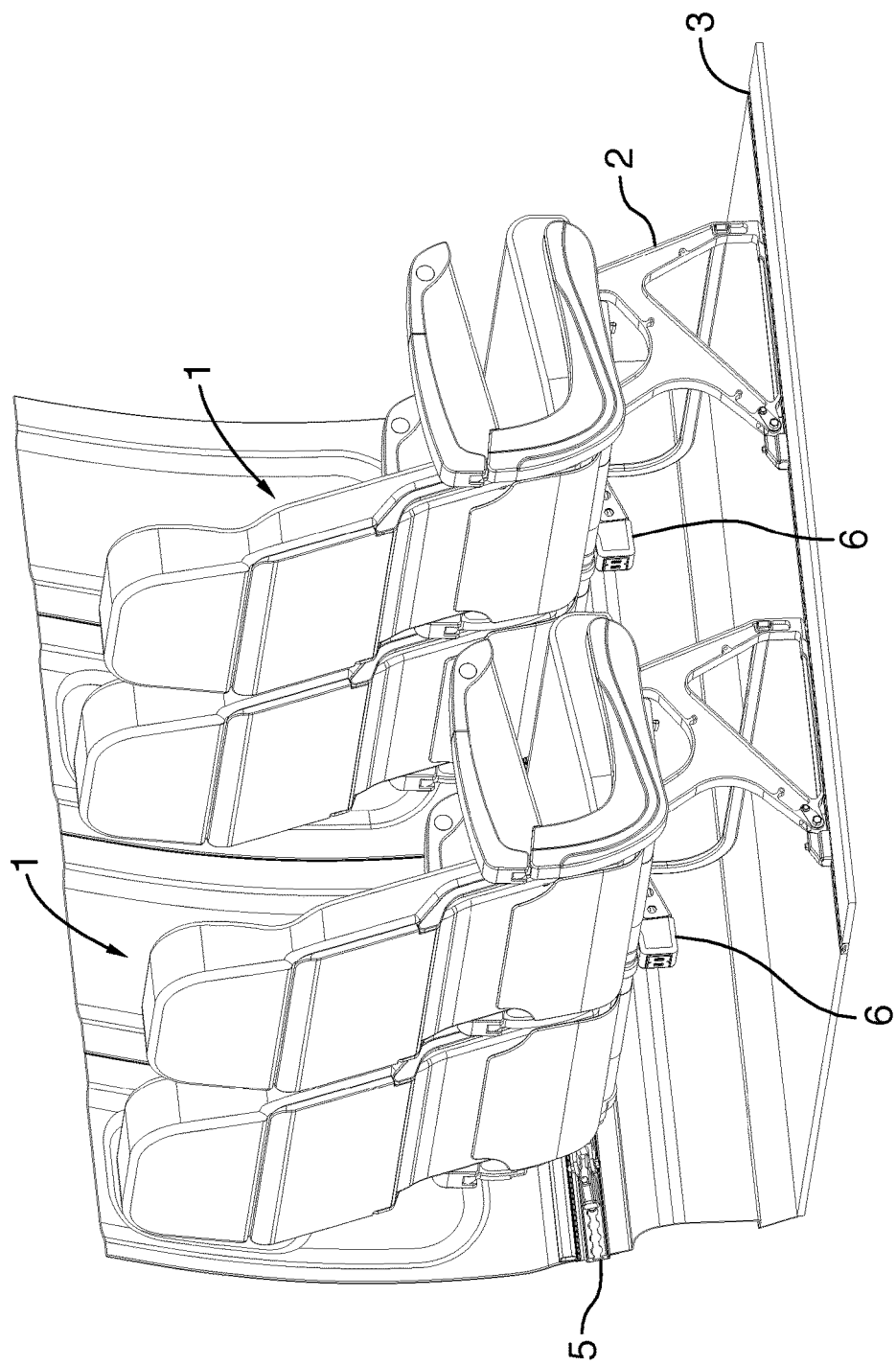
FIG. 3 is a rear-right view of the two seat assemblies, seat tracks and USB housings.

FIGS. 1-5 show views of a two seat aircraft passenger seat assembly 1 that is commonly used in narrow body or single aisle aircraft. The passenger seat assembly 1 has a leg frame 2 secured to the cabin floor seat track 3. As seen in FIGS. 2 and 6, a common seat configuration includes two cylindrical lateral beams 4 spanning between the leg frame 2 and a side wall seat track 5. The lateral beams 4 support the passenger seat, armrests and back. The lateral beams 4 have their outboard end adjacent the cabin wall that is slidably and releasably secured with fasteners in the side wall seat track 5 in a manner known to those in the art and need not be explained in detail herein.

Figure 6:
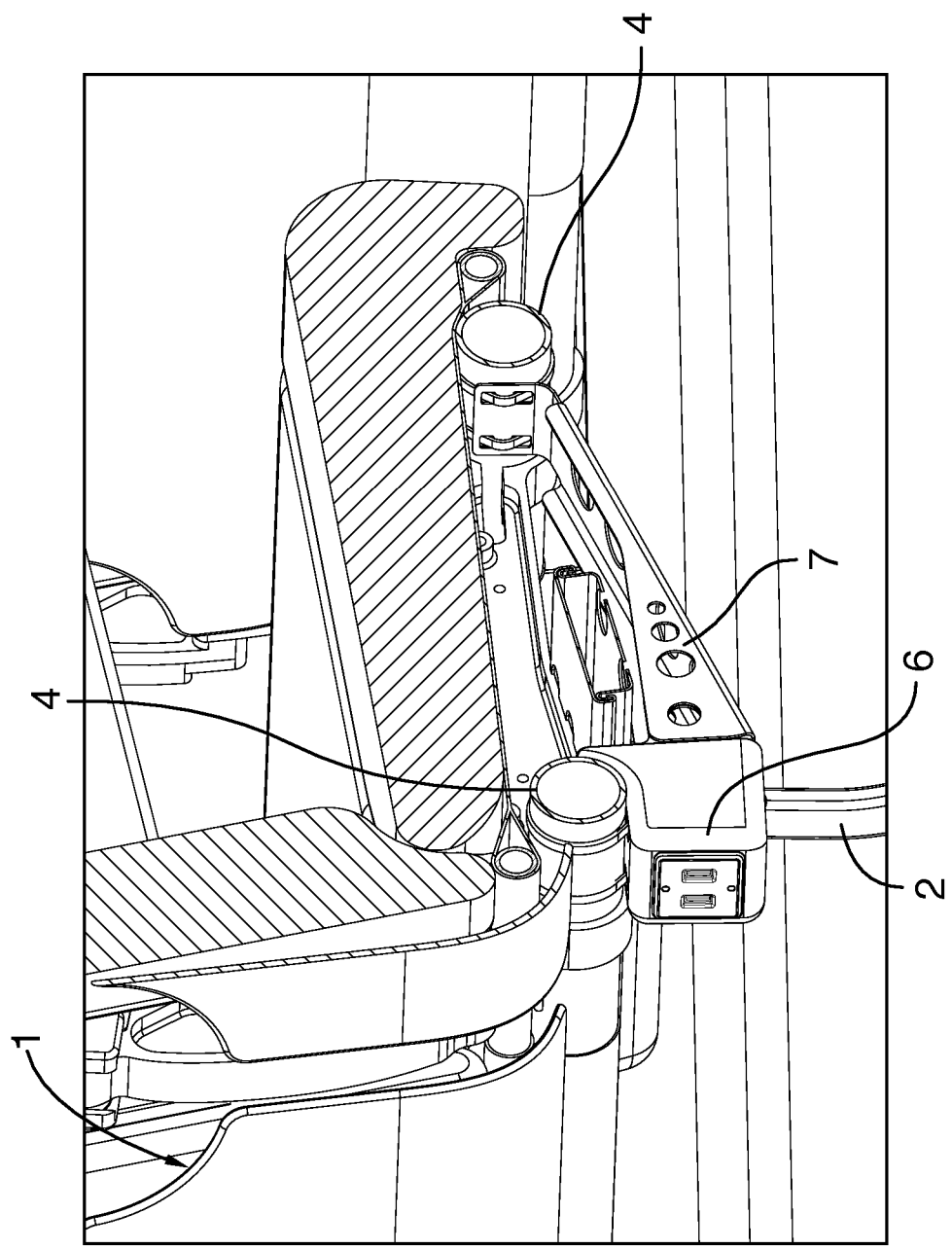
FIG. 6 shows a rear-right sectional view of the USB housing and support bracket mounted with cable ties to the cylindrical tube beams of the seat assembly.

As shown in the detail view of FIG. 6, an outlet 6 is secured to the seat assembly 1 using an underhung bracket 7 that is fastened with flexible straps to the horizontal tubular beams 4. In the example illustrated in the drawings, the outlet 6 is shown with a dual USB socket configuration. Various types of outlets 6 are possible within the same housing and bracket configuration such as for example, a USB electrical power outlet; a USB data communications outlet; and a 3 prong electrical power outlet.

The outlets 6 provide a simple rapid means by which AC electrical power or USB electrical battery recharging or data communications can be installed onto aircraft passenger seat assembly 1. The underhung mounting bracket 7 can be quickly installed with flexible cable ties or adjustable straps to the beams 4, and provides sufficient adjustment in length to accommodate a variety of aircraft seat structures.

Figure 4:
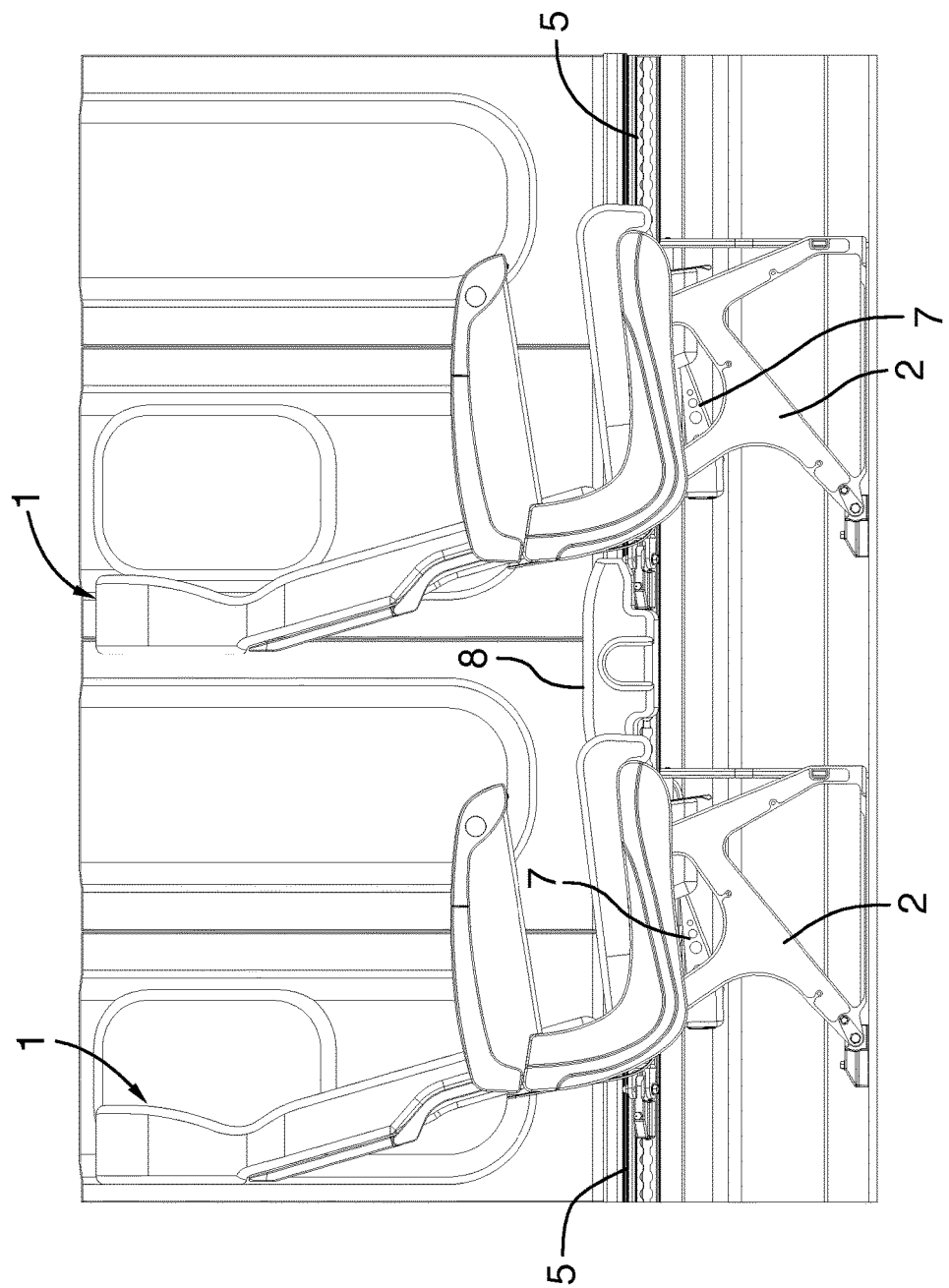
FIG. 4 is a right side view showing the side wall seat track supporting a power and communication hub between the front and rear two seat assembly.
Figure 5:
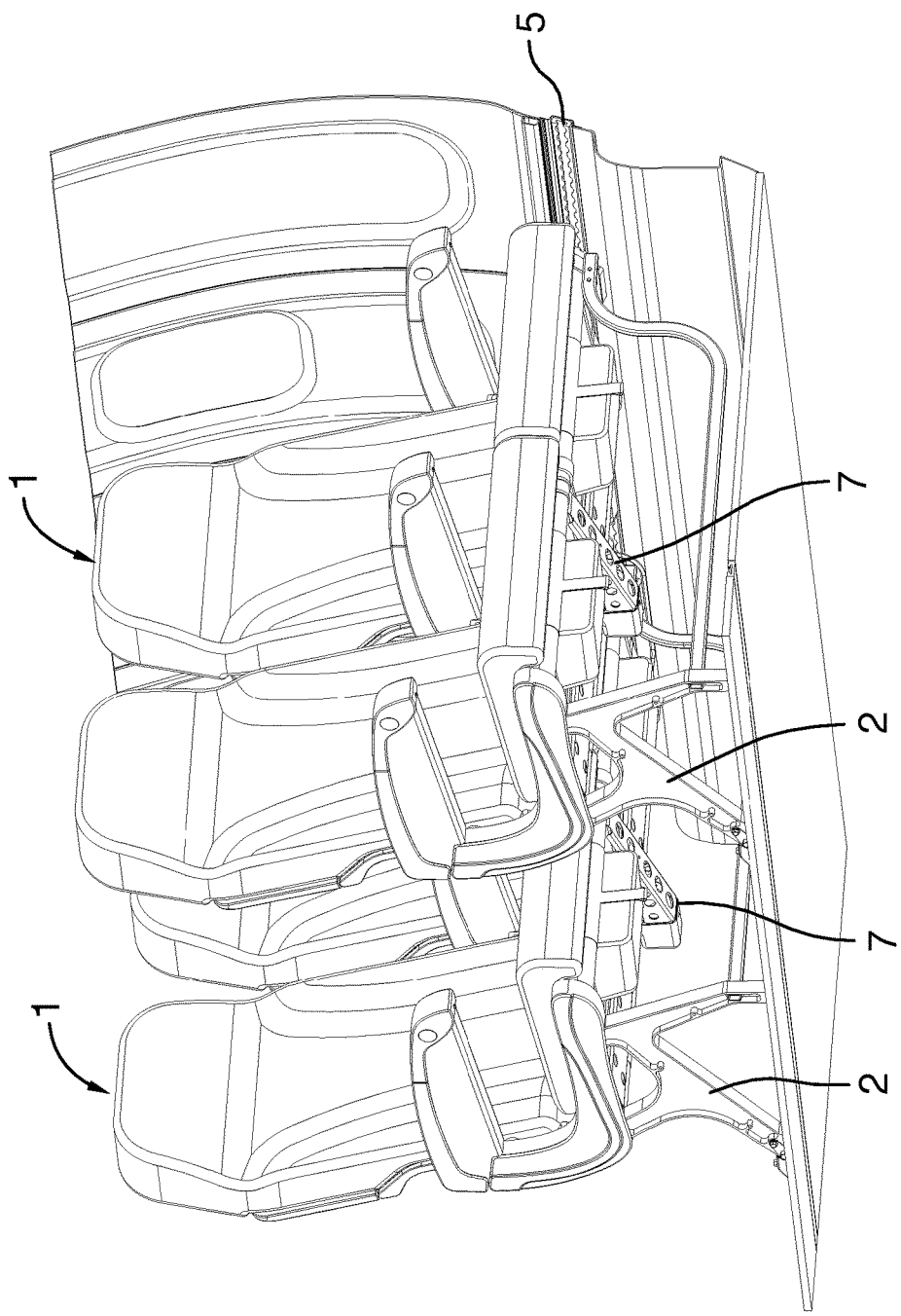
FIG. 5 is a bottom right view showing the underside of the seats and bracket that supports the USB housing.
Figure 11:
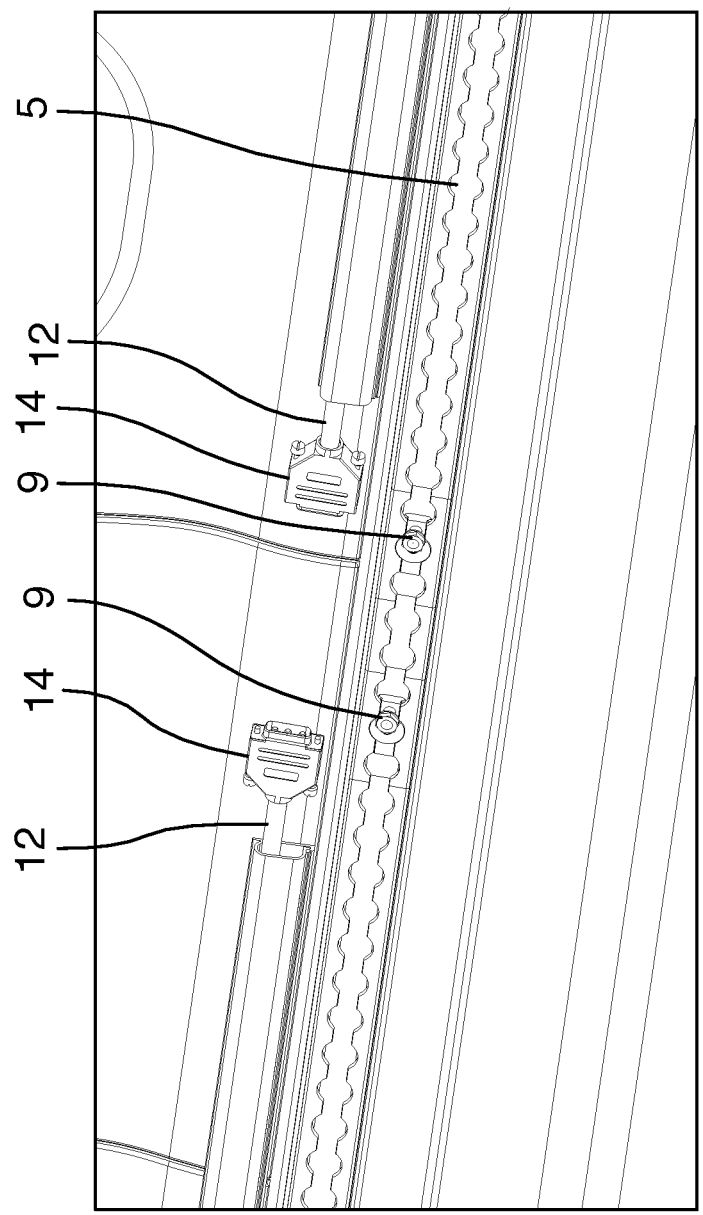
FIG. 11 shows the side wall seat track, mounting inserts for the hub, side wall cables and covers.
Figure 12:
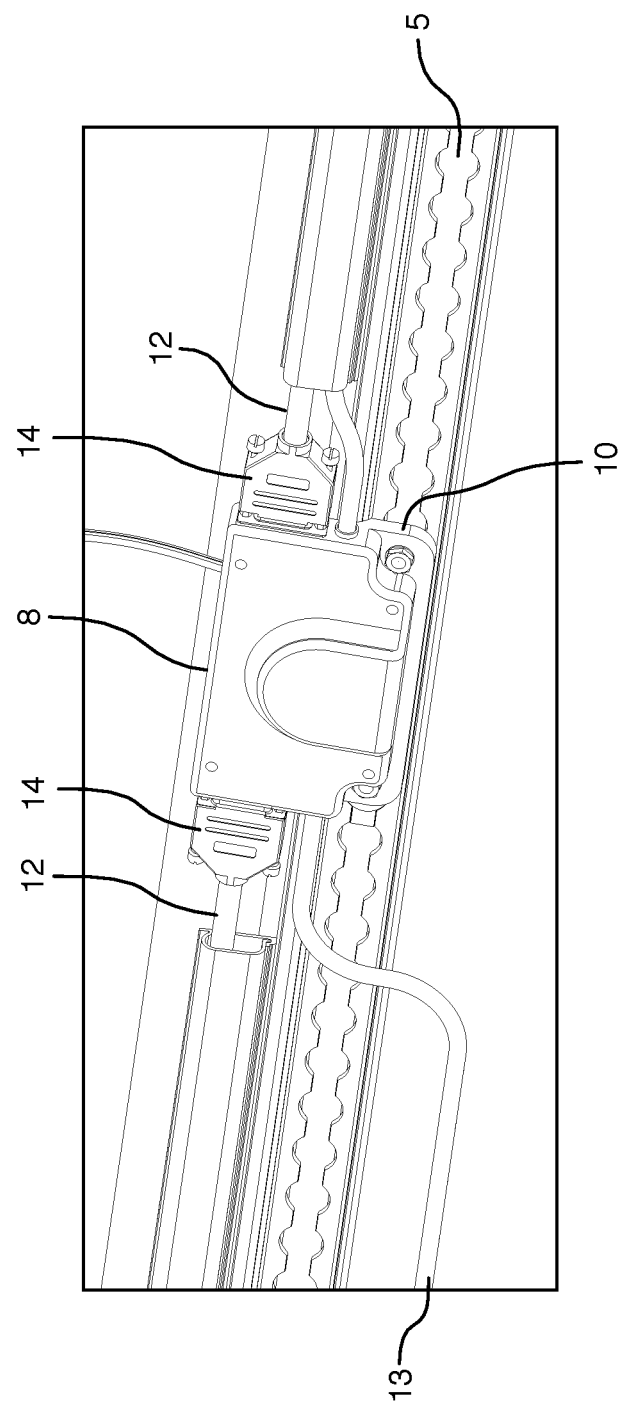
FIGS. 12 and 13 shows the hub mounted and connected to the side wall cables.
Figure 13:
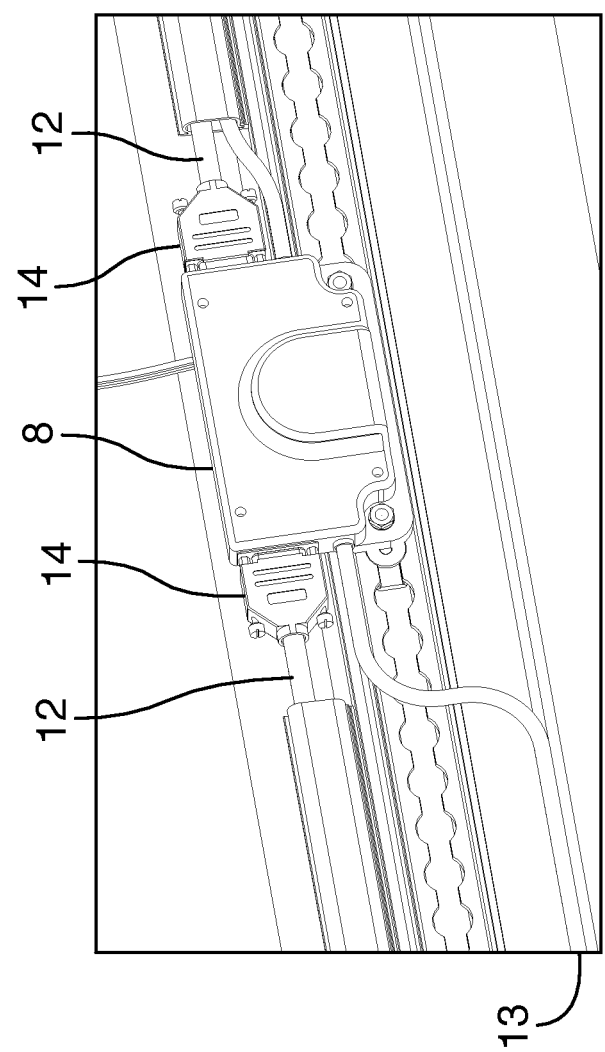
Figure 14:
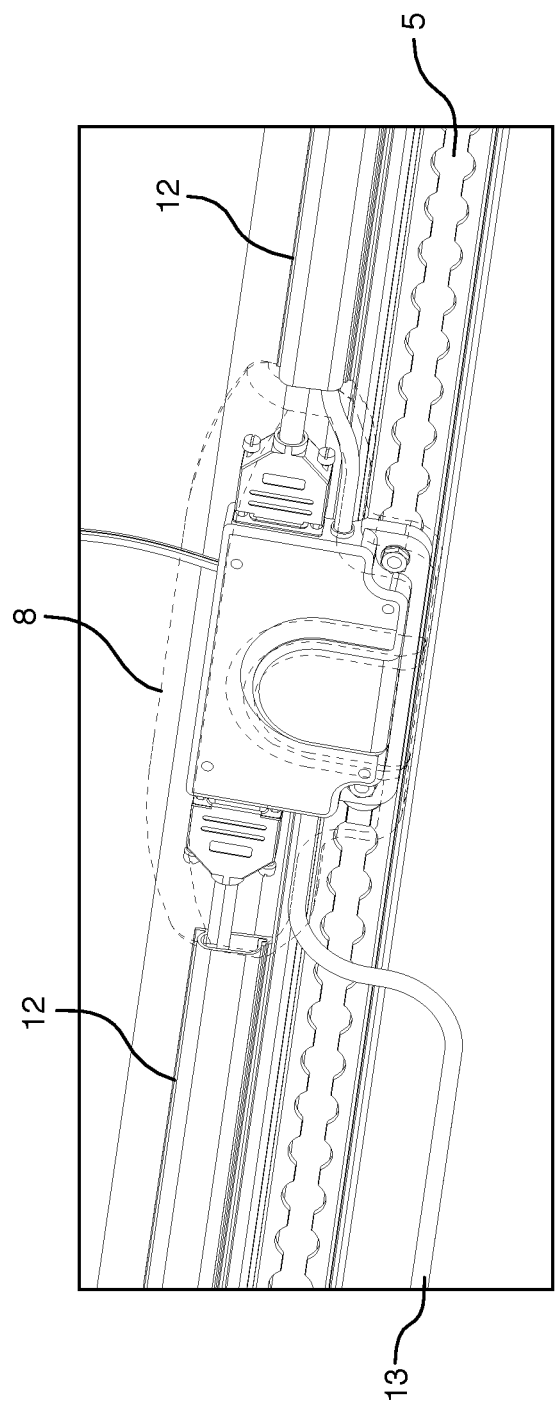
FIGS. 14 and 15 shows the installed hub with removable protective cover and cable for communicating with the seat mounted USB outlets.

The outlets 6 are hard wired to the aircraft electrical and data communications systems via a hub 8 illustrated in FIGS. 4, and 7-15. As best seen in FIG. 4, the hub 8 is mounted to the side wall seat track 5 between a forward and a rearward passenger seat assembly 1. FIG. 11 shows the sliding fasteners 9 engaged in the side wall seat track 5 on which the plate 10 of the hub 8 is mounted (see FIG. 12).

Figure 7:
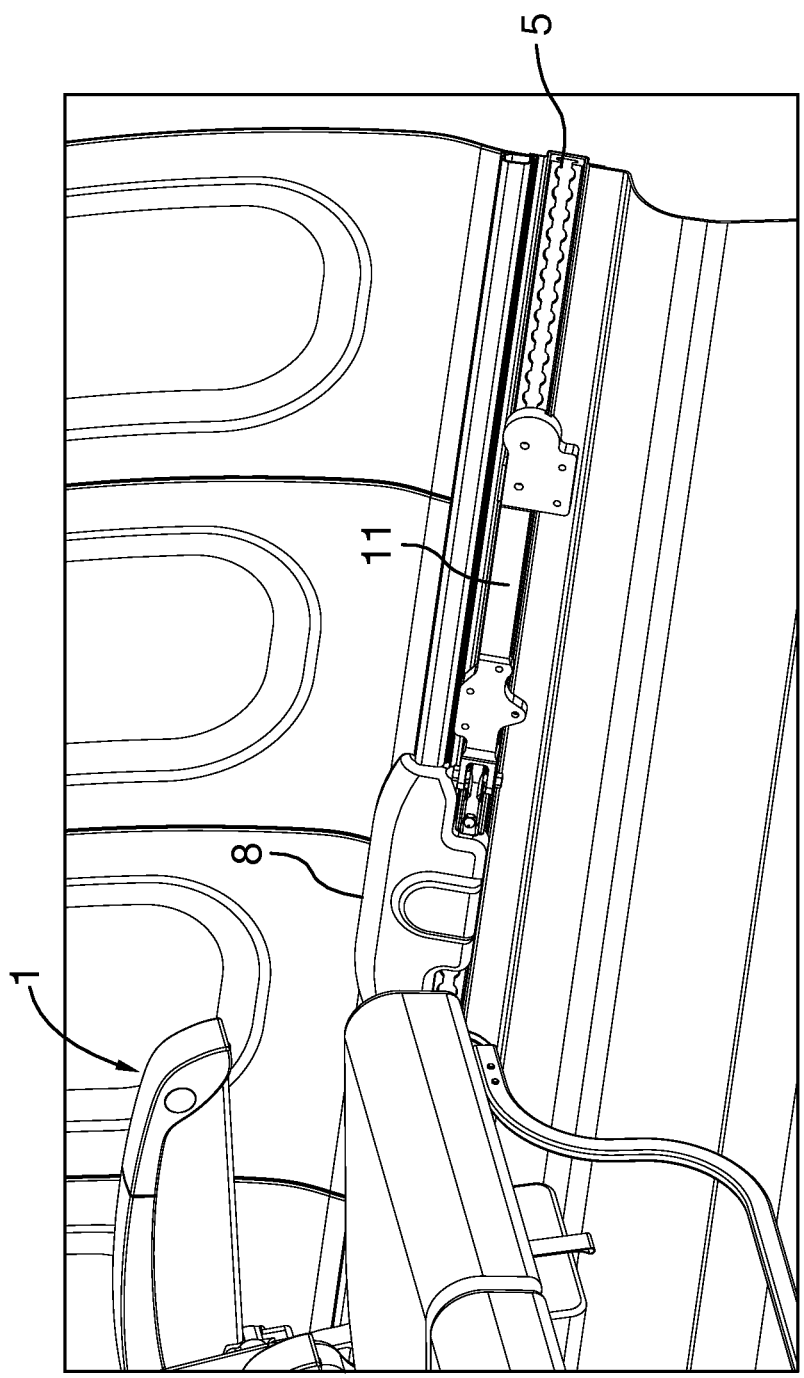
FIG. 7 shows the side wall seat track with the front two seat assembly removed to show the side wall seat track, the power and communication hub mounted to the seat track.

For clarity FIG. 7 shows the forward seat assembly removed but with the forward seat assembly mounting bracket 11 remaining engaged in the side wall seat track 5. The available space within the seat track 5 for mounting the hub 8 is limited and the proximity to the passenger's legs when seated requires that the hub 8 be low profile. However mounting on the side wall seat track 5 provides access for installation and maintenance, as well as protecting the hub 8 from damage.

Figure 8:
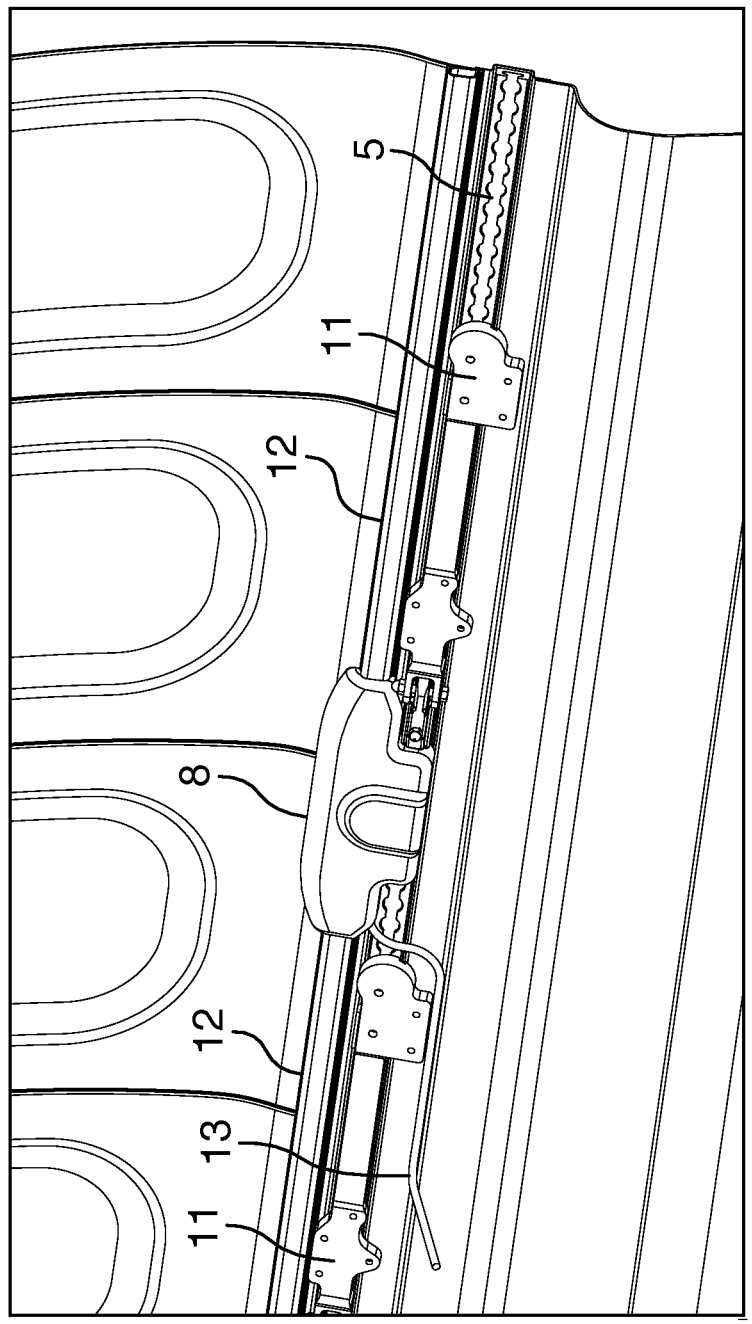
FIG. 8 shows the power and communication hub mounted in the side wall seat track between two seat mounting brackets.

FIG. 8 shows the hub 8 with the rear seat assembly removed. The hub is mounted between the seat assembly mounting brackets 11. Above the side wall seat track 5, a side wall mounted conduit 12 is installed providing the hub 8 with a hardwired connection to the aircraft source of electrical power and the aircraft source of data signal communication. The hub 8 also provides a hardwired connection to each of the outlets 6 via an outlet conduit 13.

Figure 15:
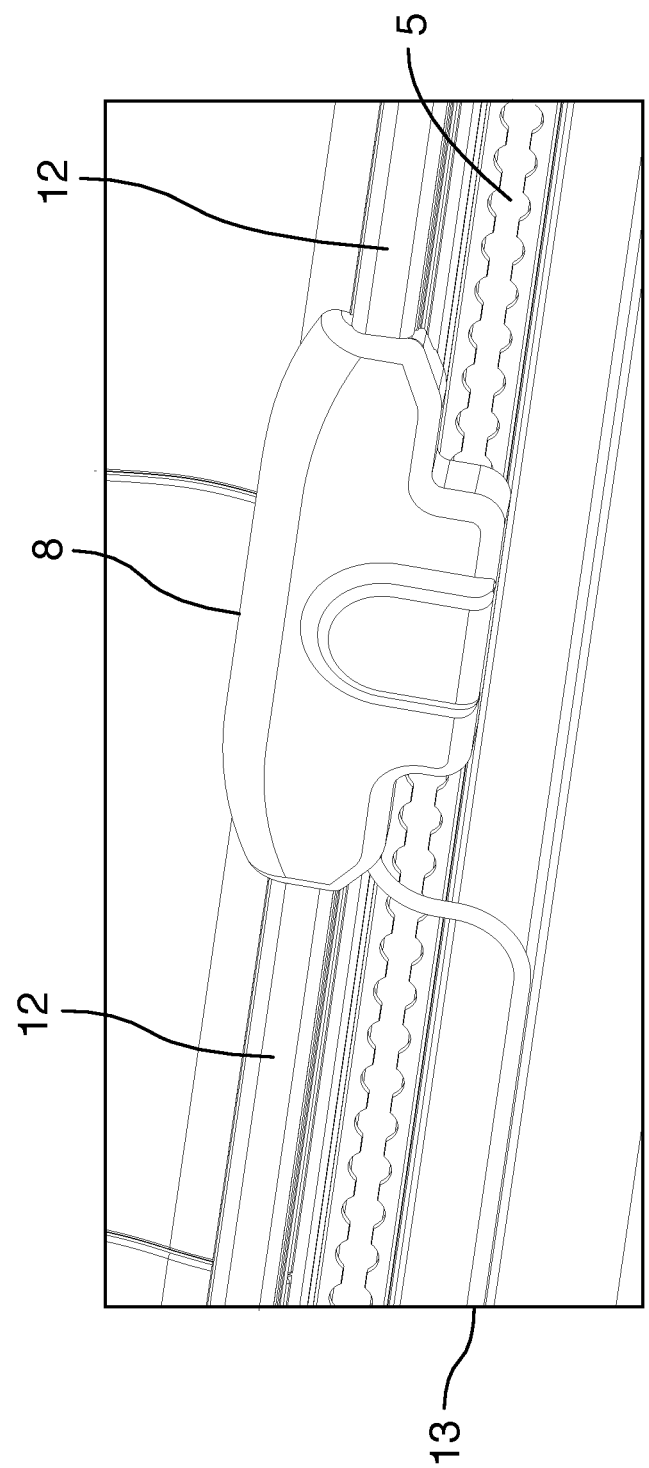

FIG. 15 shows a detail view of the hub 8 with a removable cover extending fore and aft over at least an adjacent portion of the side wall mounted conduits 12. The outlet conduit 13 as illustrated is routed to a single outlet 6 which has dual USB sockets, however the hub 8 can be hard wired to multiple seat assemblies 1 and multiple outlets 6 if desired.

Figure 9:
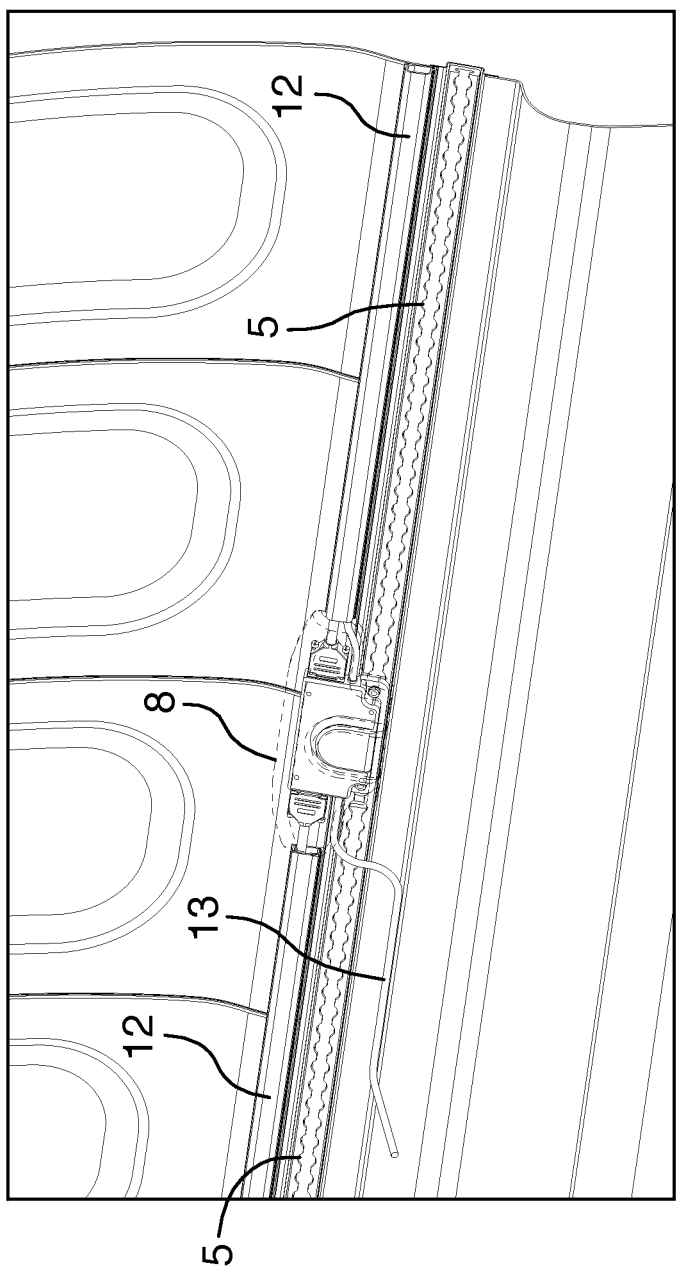
FIG. 9 shows the hub alone mounted to the side wall seat track.
Figure 10:
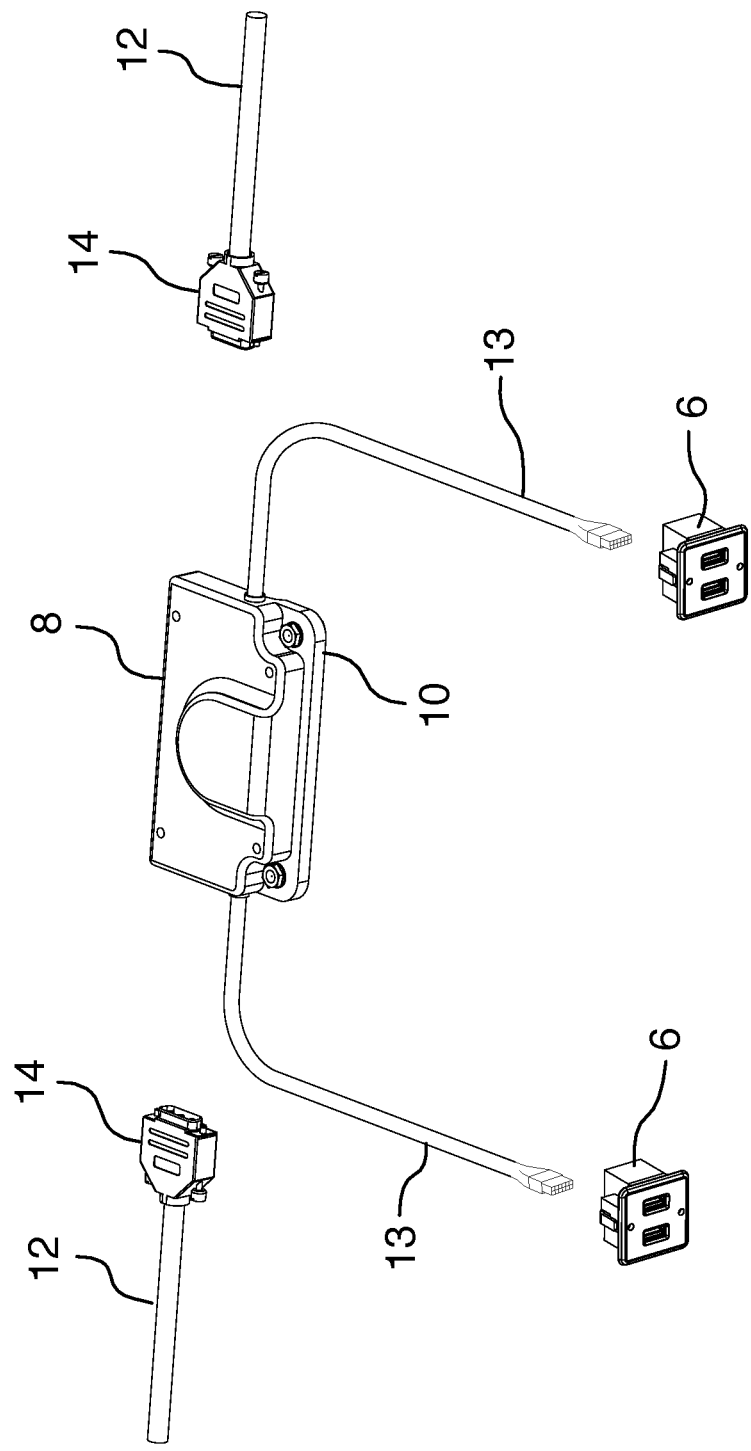
FIG. 10 is an exploded view of the hub with two USB outlets and interconnecting cables.

FIG. 9 shows the removable cover of the hub as transparent to show in assembled internal components. FIGS. 10-14 show details of the internal components including: the plate 10 for mounting the hub 8; the connectors 14 for connecting the side wall mounted conduits 12; and outlet conduits 13 for connecting the hub 8 to the outlets 6.

Although the above description relates to a specific preferred embodiment as presently contemplated by the inventor, it will be understood that the invention in its broad aspect includes mechanical and functional equivalents of the elements described herein.

The invention claimed is:

1. A system, for providing the distribution of electrical power and data signal communication inside a passenger aircraft to a passenger seat assembly, the passenger seat assembly comprising a leg frame secured to a floor seat track and at least one lateral beam spanning between the leg frame and a side wall seat track, the at least one lateral beam supporting a passenger seat and having an outboard end secured in the side wall seat track, the system comprising:
   a hub secured to the side wall seat track, the hub being connected to one of: a source of electrical power; and a source of data signal communication, via a side wall mounted conduit; and
   an outlet secured to the passenger aircraft seat assembly and communicating with the hub via an outlet conduit;
   wherein the hub is mounted to the side wall seat track adjacent to the passenger seat assembly with fasteners that mate with the sidewall seat track;
   wherein the side wall seat track has a mounting surface that is in a plane being one of: a horizontal plane; a vertical plane; and a sloped plane oriented at an acute angle to a horizontal plane.

2. The system according to claim 1 wherein the seat assembly has a weight, and wherein the installation of the outlet and outlet conduit increases the weight no more than 3% of the weight.

3. The system according to claim 2 wherein the outlet and outlet conduit are installed with connectors that do not modify the seat assembly in any way apart from added weight.

4. The system according to claim 1 wherein the outlet is one of: a USB electrical power outlet; a USB data communications outlet; a combined USB electrical communications and power outlet; and a 3 prong electrical power outlet with universal sockets.

5. The system according to claim 1 wherein the outlet is secured to the passenger seat assembly with an underhung bracket and shroud assembly mounted to the at least one lateral beam without modifying the at least one beam.

6. The system according to claim 1 wherein the hub includes a removable cover.

7. The system according to claim 6 wherein the removable cover extends over at least a portion of the side wall mounted conduit.

8. The system according to claim 1, wherein the fasteners that mate with the sidewall seat track are sliding fasteners on which a plate of the hub is mounted.

9. A system, for providing the distribution of electrical power and data signal communication inside a passenger aircraft to a passenger seat assembly, the passenger seat assembly comprising a leg frame secured to a floor seat track and at least one lateral beam spanning between the leg frame and a side wall seat track, the at least one lateral beam supporting a passenger seat and having an outboard end secured in the side wall seat track, the system comprising:
   a hub secured to the side wall seat track, the hub being connected to one of: a source of electrical power; and a source of data signal communication, via a side wall mounted conduit; and
   an outlet secured to the passenger aircraft seat assembly and communicating with the hub via an outlet conduit;
   wherein the outlet is secured to the passenger seat assembly with an underhung bracket and shroud assembly mounted to the at least one lateral beam without modifying the at least one beam.

10. The system according to claim 9 wherein the seat assembly has a weight, and wherein the installation of the outlet and outlet conduit increases the weight no more than 3% of the weight.

11. The system according to claim 10 wherein the outlet and outlet conduit are installed with connectors that do not modify the seat assembly in any way apart from added weight.

12. The system according to claim 9 wherein the outlet is one of: a USB electrical power outlet; a USB data communications outlet; a combined USB electrical communications and power outlet; and a 3 prong electrical power outlet with universal sockets.

13. The system according to claim 9 wherein the underhung bracket and shroud assembly is mounted directly to the at least one lateral beam with flexible cable ties or adjustable straps.

\* \* \* \* \*